United States Patent [19]

Skinner

[11] Patent Number: 4,887,902
[45] Date of Patent: Dec. 19, 1989

[54] OPTICAL TRANSDUCER

[75] Inventor: Alexander Skinner, Southampton, United Kingdom

[73] Assignee: Plessey Overseas Limited, Ilford, England

[21] Appl. No.: 154,705

[22] Filed: Feb. 11, 1988

[30] Foreign Application Priority Data

Feb. 11, 1987 [GB] United Kingdom ................ 8703127
Jun. 5, 1987 [GB] United Kingdom ................ 8713193

[51] Int. Cl.⁴ ............................................. G01B 11/00
[52] U.S. Cl. ................................ 356/373; 250/237 G; 356/375
[58] Field of Search ............................. 356/373, 375; 250/231 R, 231 SE, 231 P, 237 G; 177/DIG. 6

[56] References Cited

U.S. PATENT DOCUMENTS 4,387,300 6/1983 Dudash et al. ................ 250/237 G

Primary Examiner—F. L. Evans
Attorney, Agent, or Firm—Fleit, Jacobson, Cohn, Price, Holman & Stern

[57] ABSTRACT

A linear to rotary transducer comprising a linearly movable input structure restrained against rotation by a rotation restraining arrangement and a rotatable output structure, in which a permanently biased torsion spring having the rotatable output structure integral with it is fixed at one end relative to the rotation restraining arrangement and provides at its other end an elongate torsion spring strip along which a linearly movble connection is provided between the linearly movable input structure and the torsion spring strip so that as the input structure and thus the linearly movable connection move towards or away from the rotatable structure the effective location of the rotatable output structure within the active part of the torsion spring is varied in order to produce proportional rotation of the rotatable output structure.

8 Claims, 1 Drawing Sheet

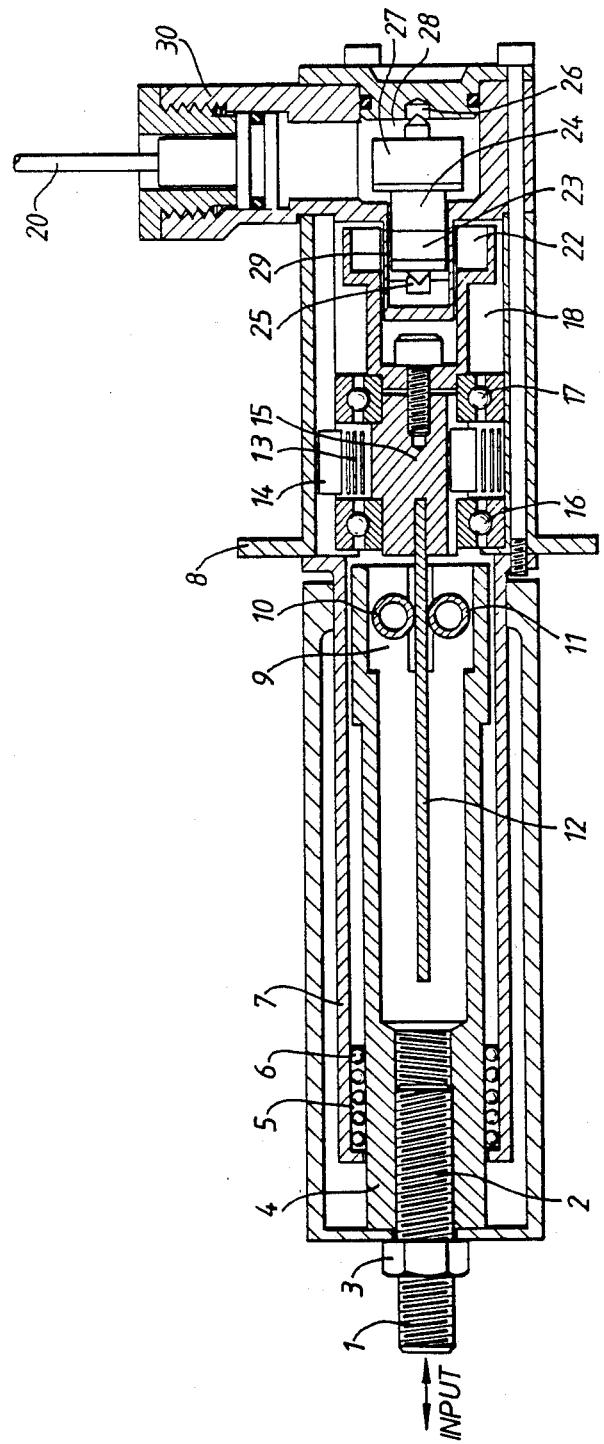

OPTICAL TRANSDUCER

This invention relates to transducers and relates more specifically to transducers of the kind for converting linear movement into rotary movement. Such transducers may be used, for example, in position sensing systems for determining the linear position or displacement of a movable body by measuring, conveniently optically, the angular displacement of a rotary member (e.g. mirror) forming part of the transducer. Measurement of the angular position of the rotary member may also be achieved magnetically, electronically or sonically.

In the case of known transducers of the kind described utilising pivotal joints, gearing, ball nuts, cams and ramps etc., the transducer parts may be subject to undesirably high friction and wear as well as presenting backlash problems and other difficulties due to vibration, shock load and hysteresis. Moreover, these known linear to rotary transducers tend to be unduly expensive to manufacture and calibrate.

According to the present invention, therefore, a linear to rotary transducer comprises a linearly movable input structure restrained against rotation by rotation restraining means and a rotatable output structure, in which permanently biased torsion spring means having said rotary output structure integral with it is fixed at one end relative to said rotation restraining means and provides at its other end an elongate torsion spring strip along which a linearly movable, preferably rolling, connection is provided between the linearly movable input structure and said spring strip so that as the input structure and thus the linearly movable connection moves towards or away from the rotatable structure the effective location of the rotatable output structure within the active part of the torsion spring means is varied in order to produce proportional rotation of the rotatable output structure.

In carrying out the present invention the linearly movable connection between the linearly movable input structure and the torsion spring strip may be provided by means of a pair of opposed rollers mounted by means of a carriage secured to the input structure and between which the torsion strip extends. As will readily be appreciated these rollers effectively clamp the torsion strip and thereby determine the active length of the torsion spring means between the rollers and the end of the spring means fixed relative to the restraining means.

The torsion spring means preferably includes a spiral clock type torsion spring which is effectively connected between the rotary structure and the rotation restraining means but this could be replaced by another torsion spring (e.g. torsion strip).

By way of example the present invention will now be described with reference to the accompanying single-figure drawing which comprises a longtitudual cross-sectional view of a linear to rotary transducer for use in an optical position sensing system.

Referring to the drawing the transducer comprises a linearly movable input member 1 which is positionally adjustably attached by screw means 2 and locking nut 3 to an internally threaded cylindrical sleeve 4. The input member 1 and thus the member 4 are restrained against rotation by means of a rotation restraining arrangement 5 which includes linear ball bearing devices 6 introduced between the sleeve 4 and a further sleeve 7 which is secured at one end to a fixed mounting structure 8 for the transducer. The end of the sleeve 4 nearest the transducer mounting structure 8 has secured to it by means of a carriage 9 a pair of rollers 10 and 11 between which extend a torsion spring strip 12 forming part of a permanently biased torsion spring means of the transducer now to be described.

The torsion spring means includes a spiral clock type torsion spring 13 one end of which is fixedly secured at 14 to the transducer mounting structure 8. The other end of the torsion spring 13 is attached to a rotary member 15 of the transducer which is rotatably mounted by means of bearings 16 and 17 within a cavity 18 of the mounting structure 8. The torsion spring strip 12 which extends between the clamping rollers 10 and 11 is fixed at one end to the rotary member 15 and is free at its other end.

The active part of the torsion spring means including the springs 12 and 13 comprises that part of the torsion spring strip 12 between the clamping rollers 10 and 11 and the rotary member 15 and the full length of the spring 13 secured to the structure 8. The active part of the torsion spring means is permanently biased with a constant angle of twist, that part of the spring strip 12 between the clamping rollers 10 and 11 and the free end of the strip remaining unstrained by the permanent biasing torsional forces.

In operation of the transducer, as the linear movable rod 1 is displaced towards or away from the rotary member 15 in response to the movement of an object (not shown), the position or displacement of which is to be determined by the position sensing system, the clamping rollers 10 and 11 will roll along the spring strip 12 thereby increasing or reducing the active length of the torsional spring means whilst the overall angle of twist remains constant thus increasing or reducing both the torsional rate and the torque within the active torsional spring length.

Since the rotary member 15 is located at a fixed distance from the fixed end 14 of the torsion spring 13 any increase or decrease in the overall active torsion spring length proportionally varies the location of the rotary member 15 within the active part of the torsion spring means thus causing the rotary member 15 to rotate proportionally. The rotary member 15 is connected to and drives a rotatable iron "keep" ring 22 which is magnetically coupled to a bar magnet 23 which is carried by an optical planar diffraction grating mirror carrier 24. This carrier is rotatably mounted by means of garnet pivot bearings 25 and 26 such that the carrier rotates with the rotary structure 15 due to the magnetic coupling between the "keep" ring 22 and bar magnet 23. The planar grating mirror 27 carried by the carrier 24 will also rotate and by such rotation the grating spectrally filters a white light beam emerging from an optical fibre 20 and returns filtered narrow band light to a second optical fibre (not shown) closely adjacent the fibre 10. The wavelength of the returned filtered light varies with the angle of rotation of the grating 27 and the member 15 and hence with the linear displacement of the transducer.

As will be appreciated, the rotary movement of the rotary member 15 may be directly proportional to the linear movement in the case of spring strip 12 being of uniform transverse cross-section throughout its length or the cross-section of the strip could vary along its length in order to provide a variable linear to rotary characteristic. In order to hermetically seal inert gas filled mirror cavity 28 against the ingress of dirt and moisture a cylindrical membrane 29 is provided between the magnet 23 and the rotatable "keep" 22. This membrane has a closed end adjacent to bearing 25 and is integral with the mirror housing 30.

The transducer according to the present invention is free from backlash since fixed connections are provided between the input member 1 and the rotary output member 15 apart from where the rollers 10 and 11 clampingly engage with the spring strip 12. However, at the rollers and at the rotation restraining bearings the biasing spring torque is always in the same direction so that backlash will be avoided.

Compensation is provided for changes in length of the spring strip 12 relative to the housing of the transducer due to changes in temperature by mounting the spring strip 12 co-axially relative to the housing.

Moreover, any change in the modulus (i.e. ability to resist twist) of the strip material of the strip 12 and the spiral spring 13 due to temperature change will not affect the accuracy of the transducer as a whole since the latter works independently of the actual torque level produced by the strip elasticity. Moreover, since the tranducer works independently of torque level the elastic hysteresis of the strip does not affect the accuracy of the transducer.

The cylindrical configuration and consequential robustness of the transducer construction imparts a high natural resistance to shock and the spring mass characteristic of the strip and the rotary member 15 can be selected to ensure that any natural frequencies there are fall outside the range of vibration frequencies occurring in the particular environment of operation of the transducer.

I claim:

1. A linear to rotary transducer comprising:
   (a) a linearly movable input structure;
   (b) rotation restraining means for preventing rotation of the input structure;
   (c) a rotatable output structure including permanently biased torsion spring means embodying an elongate torsion spring strip; and,
   (d) a linearly movable connection provided along said elongate torsion spring strip and located between the linearly movable input structure and the torsion spring strip so that the linearly moveable connection can move towards or away from the rotatable structure in order to vary the effective location of the rotatable output structure within an active part of the torsion spring means and thereby produce proportional rotation of the rotatable output structure.

2. A linear to rotary transducer as claimed in claim 1, in which the linearly movable connection between the input member and the torsion strip comprises a rolling connection.

3. A linear to rotary transducer as claimed in claim 1 in which the torsion spring means consist of two torsion springs connected respectively to opposite ends of the rotatable output structure, one of said springs being a linear strip having a free end clamped between rollers at variable positions along the length of the strip in dependence upon the linear position of the input structure and the other of said springs being a spiral or coiled spring anchored relative to the rotation restraining means whereby a constant angle of twist is always imposed on the active portion of the torsion spring.

4. A linear to rotary transducer as claimed in claim 1, in which the rotation restraining means comprises one or more ball bearing devices located between the input structure and part of a mounting structure for the transducer.

5. A linear to rotary transducer as claimed in claim 3, in which the said other torsion spring is connected between the rotatable output structure and part of the mounting structure for the transducer.

6. A linear to rotary transducer as claimed in claim 1, in which the rotatable output structure is mounted by ball bearings and is connected to a carrier for a diffraction grating mirror through a magnetic coupling arrangement which enables the carrier to rotate with the rotatable output structure and by such rotation a beam of light emerging from an optical fibre and impinging on the diffraction grating mirror will be spectrally filtered in dependence upon the angular position of the rotatable output structure and reflected into another optical fibre.

7. A linear to rotary transducer as claimed in claim 6, in which the magnetic coupling arrangement comprises a "keep" ring attached to the rotary member and a bar magnet attached to the mirror carrier.

8. A linear to rotary transducer as claimed in claim 6, in which the diffraction grating mirror is mounted within a sealed inert gas filled cavity.

* * * * *